US006116268A

United States Patent [19]

Johnson

[11] Patent Number: 6,116,268

[45] Date of Patent: Sep. 12, 2000

[54] WELLHEAD SAFETY VALVE CONTROL SYSTEM

[75] Inventor: Clarence William Johnson, Calgary, Canada

[73] Assignee: Barber Industries Inc., Calgary, Canada

[21] Appl. No.: 09/193,570

[22] Filed: Nov. 17, 1998

[51] Int. Cl.$^{7}$ .................................................... F16K 17/00

[52] U.S. Cl. ............................ 137/458; 137/492.5; 499/6

[58] Field of Search ................................ 137/458, 492.5; 166/363, 373; 251/1.1

[56] References Cited

U.S. PATENT DOCUMENTS 5,341,837 8/1994 Johnson .................................. 137/458
5,526,883 6/1996 Breaux ................................. 137/492.5

OTHER PUBLICATIONS

"Baker CAC" brochure. 3 page brochure. 1989–1990.

Enerpac "High Force Hydraulic Tools" brochure. 3 page brochure. 1994.

"Power Team" brochure. 3 page brochure. 1997.

3–Way Indicating Hydraulic Controller, Sigma Enterprises Inc., (2 pages) "Sigma Enterprises Inc." brochure. 3 page brochure. 1995.

Pages 5380 and 5381 from a trade brochure entitled "Page Oil Tools". Date Unknown.

Page 10 from a trade brochure entitled "Otis Surface Safety Equipment and Systems". Date Unknown.

Technical Bulleting entitled Barber Hydraulic Pilot, Model "2L–H+L–T1–B6" by Barber Industries Ltd., dated Feb. 24, 1993.

*Primary Examiner*—Stephen M. Hepperle
*Attorney, Agent, or Firm*—John Russell Uren

[57] ABSTRACT

A wellhead safety valve control system for opening and closing subsurface and surface safety valves in a predetermined sequence and certain components used with such control system. Dump valves in both latching and non-latching configurations are utilised within the control system. Embodiments of the dump valve may incorporate a time delay feature to ensure the subsurface safety valve is closed after a desired time period following the closure of the surface safety valve in the event of flowline anomalies. Provision is made for independent closure of the surface safety valve without closure of the subsurface safety valve.

11 Claims, 9 Drawing Sheets

WELLHEAD SAFETY VALVE CONTROL SYSTEM

INTRODUCTION

This invention relates to a wellhead safety valve control system and, more particularly, to a wellhead safety valve control system used for closing a surface safety valve(SSV) and a subsurface safety valve(SCSSV) in a controlled sequence and to dump valves used as components of the system used for achieving the valve shutdown.

BACKGROUND OF THE INVENTION

In our U.S. Pat. No. 5,291,918 dated Mar. 8, 1994 and entitled SAFETY VALVE ACTUATOR ASSEMBLY, there is disclosed a safety valve actuator used for closing a gate valve in a flowline and a hydraulic circuit which schematically illustrates the flow of hydraulic fluid in the circuit.

Improvements have been made, however, to overcome some of the disadvantages of the apparatuses taught in the '918 patent. One disadvantage of such apparatuses is that no provision was made for pressure relief. It is possible for fluid in the control circuit to increase or decrease in volume as the ambient temperature increases or decreases and provision should be made to allow for pressure relief in the event that the components are required to handle the pressure created by the increased fluid volume.

Other advantages in the present invention will become apparent during the detailed description and explanation made hereafter.

SUMMARY OF THE INVENTION

According to one aspect of the invention, there is provided a wellhead safety valve control system for opening and closing a surface controlled safety valve and a surface controlled subsurface safety valve, said system comprising a first dump valve and a first safety valve circuit operably associated with said surface controlled safety valve, a second dump valve and a second safety valve circuit operably associated with said surface controlled subsurface safety valve, an SSV trip control circuit operably associated with said first dump valve, an SCSSV trip control circuit operably associated with said second dump valve, a pump operably associated with said first and second safety valve circuits and at least one check valve to operably isolate said SCSSV trip control circuit of said second dump valve from said SSV trip control circuit of said first dump valve.

According to a further aspect of the invention, there is provided a method of sequentially or individually closing a surface safety valve and a subsurface safety valve, said method comprising monitoring the pressure of said flowline with a pilot circuit, opening a trip valve when said pressure falls outside of a predetermined range, exhausting fluid within said pilot circuit to a reservoir when said trip valve is opened, reducing the pressure of fluid within a first dump valve during the exhaustion of fluid from said pilot circuit to said reservoir and opening said first dump valve and closing said surface safety valve.

According to yet a further aspect of the invention, there is provided a method of opening subsurface and surface safety valves, said method comprising pumping fluid at a first pressure to a second dump valve operably associated with said subsurface safety valve to thereby close said second dump valve, continuing said pumping to increase pressure in an SCSSV safety valve circuit to open said subsurface safety valve, closing a first dump valve, pumping fluid at a second pressure to increase pressure in said first dump valve and in an SSV safety valve circuit, opening said surface safety valve by said increased pressure, monitoring the pressure in said flowline within predetermined limits with a pilot, opening said first dump valve when said pressure in said flowline falls outside said predetermined limits and closing said surface safety valve when said first dump valve is opened.

According to still yet a further aspect of the invention, there is provided a dump valve for controlling the opening and closing of a safety valve, said dump valve comprising a body, a piston movable within said body, a dump valve poppet on said one side of said piston, an inlet port to supply fluid to one side of said dump valve poppet, an exit port to allow fluid egress on the opposite side of said dump valve poppet, and a pushrod operable on said dump valve poppet and movable by said piston to open said dump valve poppet and allow fluid flow from said one side to said opposite side of said dump valve.

According to still yet a further aspect of the invention, there is provided a method of closing a subsurface safety valve comprising reducing pressure in an SCSSV trip control circuit operably associated with a second dump valve, opening said second dump valve by said reduction of pressure in said SCSSV trip control circuit, exhausting fluid from an SCSSV safety valve circuit operably associated with said subsurface safety valve through said second dump valve to a SCSSV return tank and thereby closing said subsurface safety valve.

BRIEF DESCRIPTION OF THE SEVERAL VIEWS OF THE DRAWINGS

Specific embodiments of the invention will now be described, by way of example only, with the use of drawings in which.

DESCRIPTION OF SPECIFIC EMBODIMENT

Figure 1:
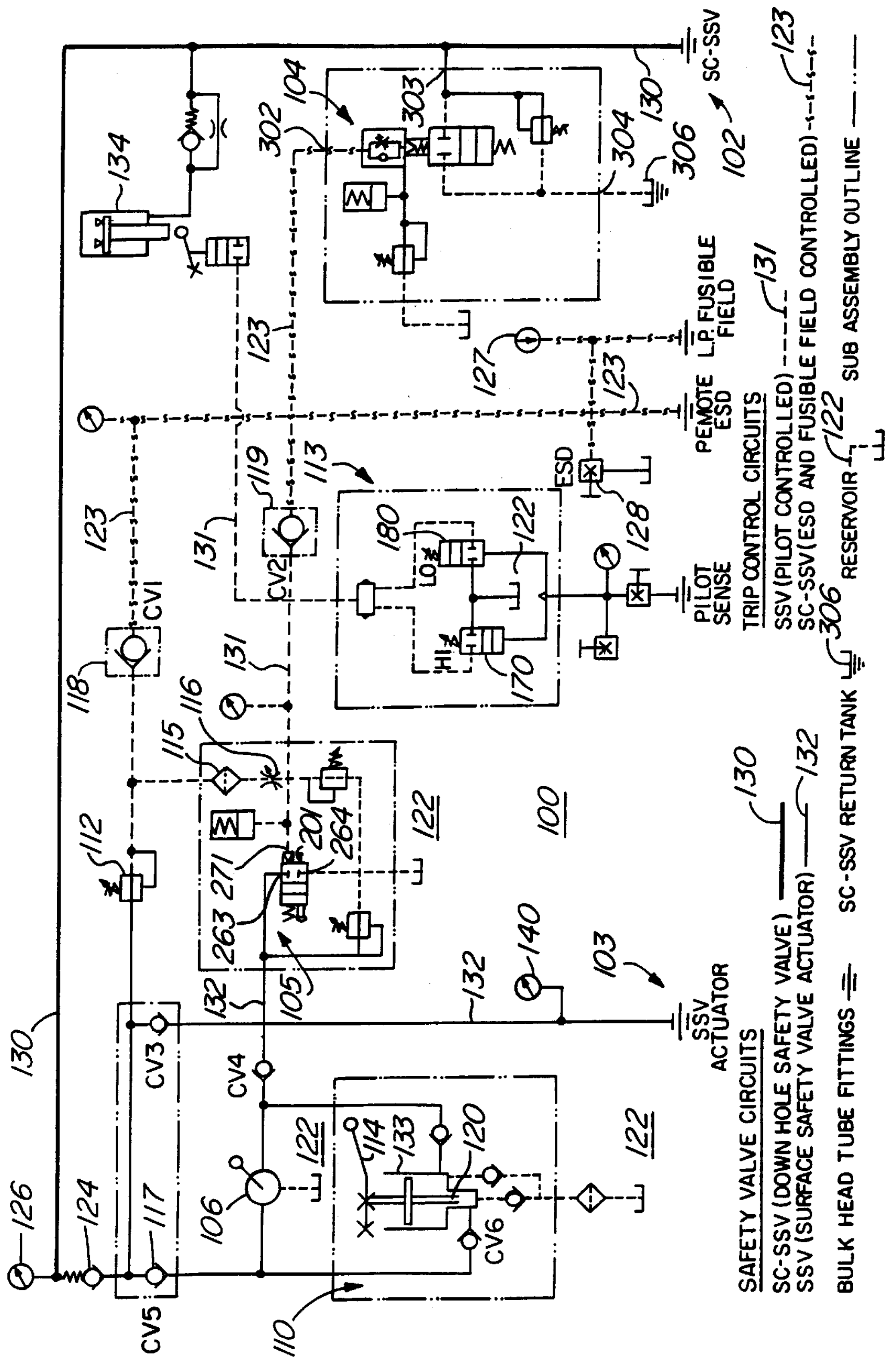
FIG. 1 is a diagrammatic schematic of the hydraulic circuit used for the control of the subsurface and surface safety valves according to one aspect of the invention.

Referring now to the drawings and, in particular, to FIG. 1, a hydraulic schematic circuit for a controller used in closing subsurface and surface safety valves 102, 103, respectively, is generally illustrated at 100. Two trip control circuits are included, namely a pilot controlled surface safety valve circuit 131 and an emergency shut down (ESD) and fusible field circuit 123. Two safety valve circuit are likewise shown, namely a downhole subsurface safety valve circuit generally illustrated at 130 and a surface safety valve actuator circuit generally illustrated at 132. A reservoir circuit for returning fluid to the reservoir is generally illustrated at 122.

The principal components of the hydraulic circuit 100 include a dual action pump generally illustrated at 110 used for supplying fluid under high or low pressure to the subsurface and surface safety valves 102, 103, respectively, a manually operated three-way valve 106 to direct fluid from the dual action pump 110 as will be explained and a pressure regulating or reducing valve (PRV) 112 which closes at a predetermined pressure in order to prohibit flow therethrough. The pressure reducing valve 112 is provided to regulate the pressure of the fluid pumped by pump 110 to supply low pressure fluid to the SSV trip control circuit 131 and SCSSV trip control circuit 123. A first dump valve is generally illustrated at 104, which dump valve 104 incorporates a time delay, as will be explained. Dump valve 104 is operatively associated with the surface controlled subsurface safety valve 102. High and low pressure pilots 170, 180, respectively, are generally illustrated at 113. A second latching dump valve is generally illustrated at 105 and is operatively associated with the surface safety valve 103. A back pressure valve 124 is provided to open at a predetermined pressure, conveniently approximately 150 psi. A check valve 119 is used to isolate the SCSSV trip control circuit 123 from the SSV trip control circuit 131. The operation of the various components will be described hereafter in greater detail.

Figure 2A:
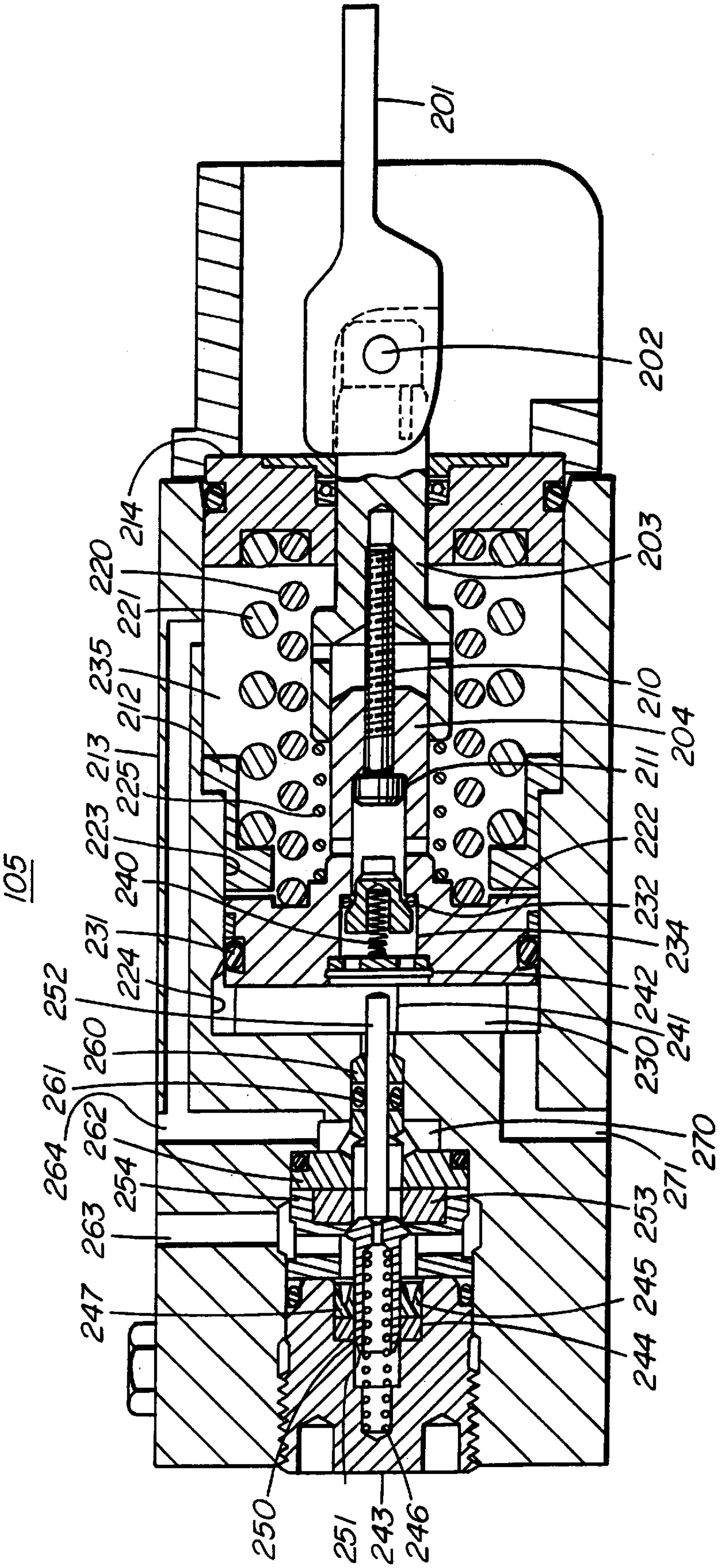
FIG. 2A is a diagrammatic cross-sectional view of a first embodiment of the dump valve according to the invention as used within the hydraulic circuit of FIG. 1, the dump valve being of the latching type and being shown in its latched and closed condition.

The latching dump valve 105 is illustrated in detail in FIG. 2A. Dump valve 105 is of the latching type and includes a toggle lever 201 rotatable about pin 202 which pin 202 connects the toggle lever 201 to the spool 203. A piston extension 204 is movable within the spool 203 and a cap screw 210 is mounted within the piston extension 204 and threads into spool 203 illustrated with the head 211 contacting the inside end of piston extension 204. A spreader spring 225 creates a bias between the spool 203 and the piston 222 which tends to maintain the head 211 of the capscrew 210 in contact with an inner diameter of piston extension 204. A spring stop 212 is mounted within the body 213 of the dump valve 105 and an end plug 214 closes the body 213. End plug 214 acts to retain inner and outer compression springs 220, 221, respectively, within a cavity 235 formed between end plug 214 and piston 222. Outer compression spring 221 is retained at its end opposite the end plug 214 by spring stop 212. Inner compression spring 220 is retained at its end opposite the end plug 214 by piston 222.

Figure 2B:
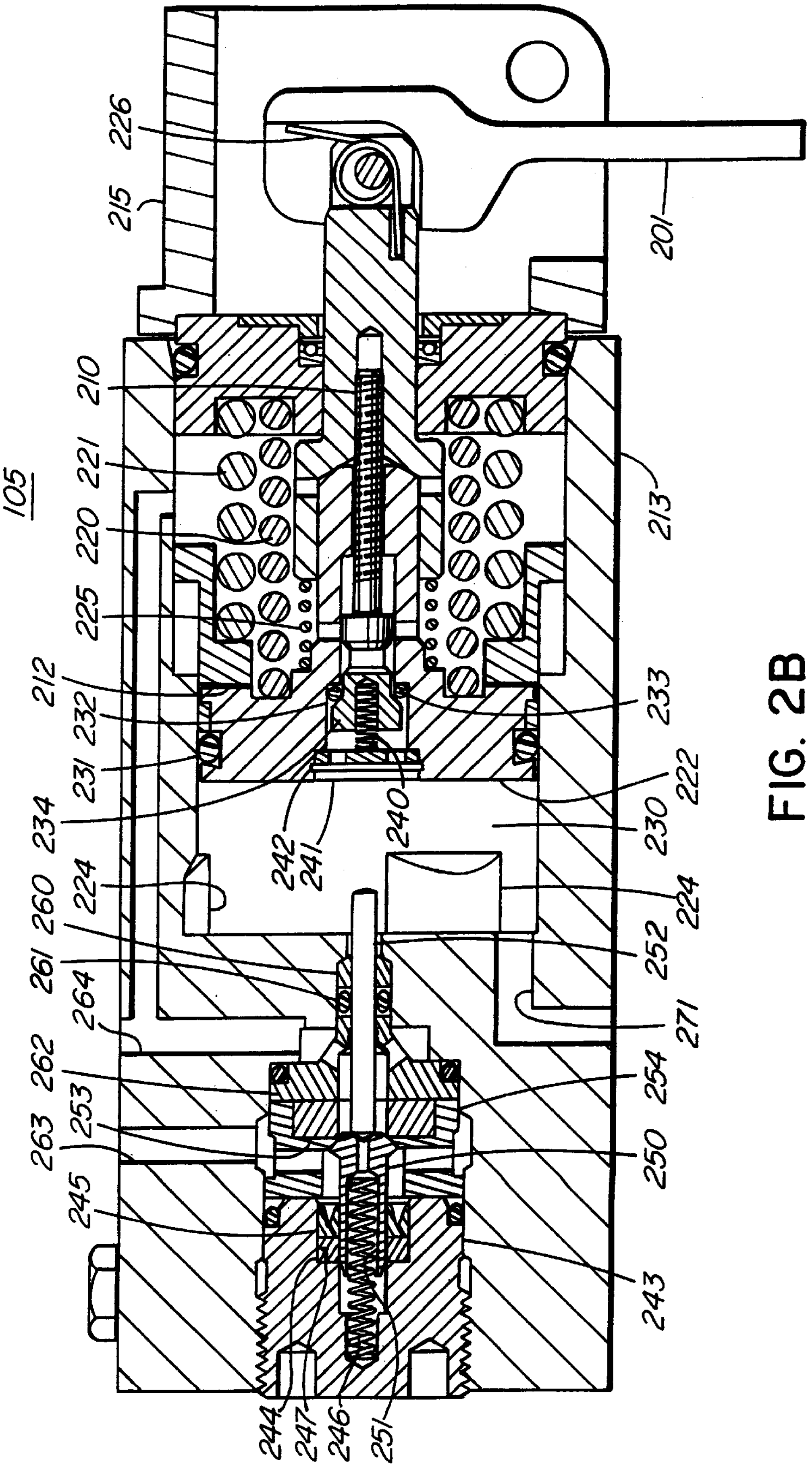
FIG. 2B is a diagrammatic cross-sectional view of the latching dump valve of FIG. 2A illustrating the valve in its armed and closed condition.

Piston 222 moves within the body 213 between a section of the body 213 having a first diameter 223 and a section of the body 213 having a plurality of cutouts 224, the number of such cutouts conveniently numbering three (3). The cutouts 224, illustrated in greater detail in FIG. 2B, are used to provide for rapid fluid egress from the fluid cavity 230 and consequent quick movement of piston 222 towards pin or pushrod 252 while continuing to guide the piston 222 during such operation. This contributes to movement of the piston 222 with greater stability during the fluid egress operation. The use of the cutouts 224 has a further advantage in that the pressure of the fluid remaining in the fluid cavity 230 during fluid egress will be less likely to dislodge the seal 231 because the seal 231 is maintained in position within piston 222 by the uninterrupted circumference between the cutouts 224.

Piston 222 has an internal shoulder 232 formed therein. O-ring seal 233 forms a sealing relationship between the shoulder 232 and a poppet 234.

Poppet 234 is biased by a compression spring 240 (illustrated more clearly in FIG. 2B) acting between the poppet 234 and a retainer disk 241. Retainer disk 241 is held in position with a retainer ring 242. The action of compression spring 240 tends to hold the poppet 234 against o-ring 233 in a sealing relationship until contact is made with head 211 of cap screw 210 as will be described. The force provided by compression spring 240 is such that it is sufficient only to maintain the poppet 234 in contact with o-ring 233 while allowing poppet 234 to lift off the o-ring 233 when the pressure in cavity 230 becomes less than the pressure in cavity 235.

A plug 243 is threadedly engaged within body 213 at the end of body 213 opposed from the toggle 201. A cavity 247 within plug 243 holds a backup ring 244 and a seal 245.

A dump valve poppet 250 is movable within the cavity 247 of plug 243. Dump valve poppet 250 has a cavity 251. A compression spring 246 extends between the end of cavity 251 in dump valve poppet 250 and the end of the cavity in plug 243. Compression spring 246 provides a bias to dump valve poppet 250 tending to maintain poppet 250 in contact with a poppet seat 253 held by a poppet seat carrier 254. A backup ring 260 is positioned in the cavity of body 213 around a pushrod 252 and an o-ring 261 is held in position adjacent backup ring 260 on one side and by a guide 262 on the opposite side.

Figure 2C:
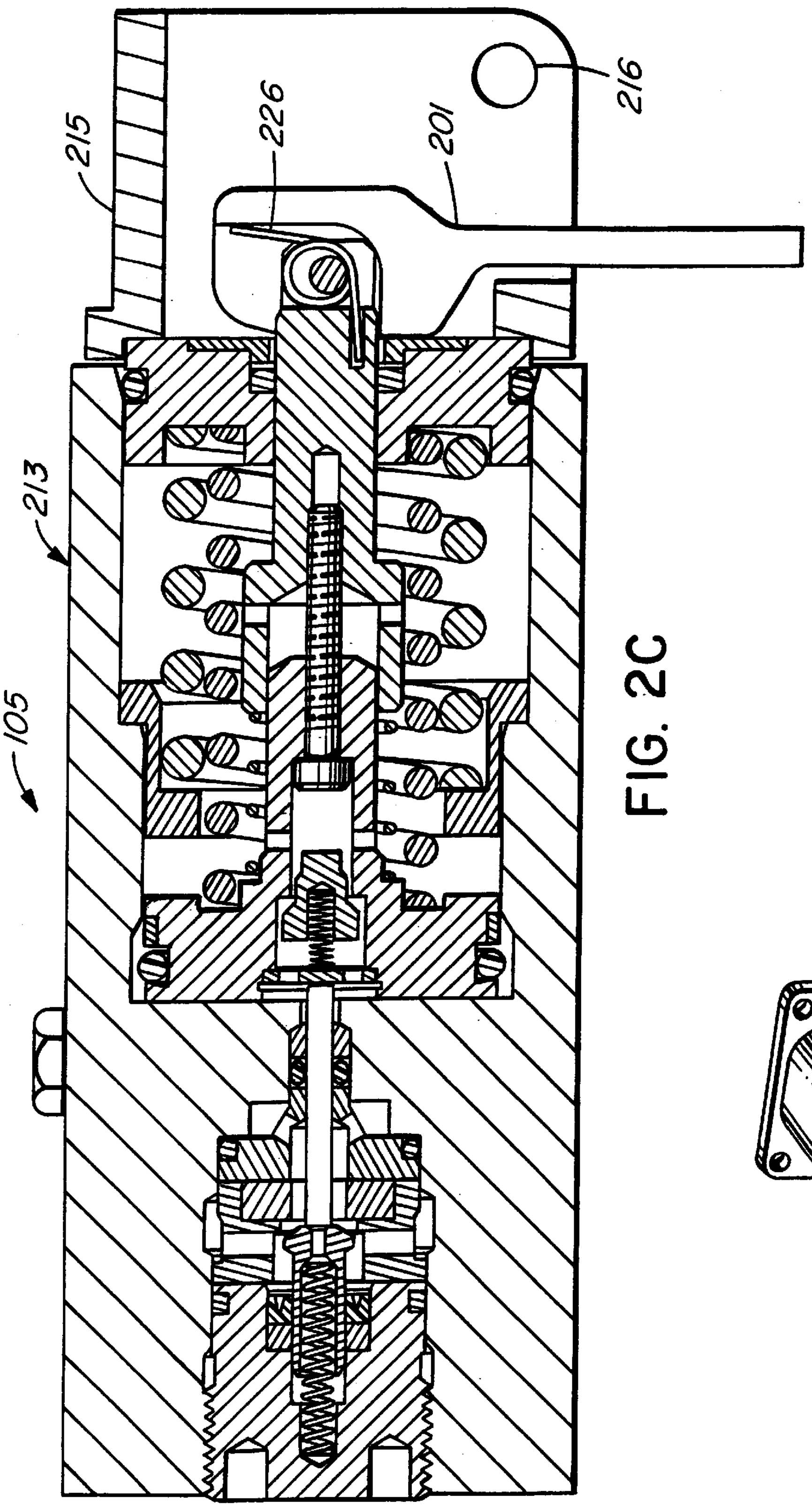
FIG. 2C is a diagrammatic cross-sectional view of the latching dump valve of FIGS. 2A and 2B illustrating the valve in its tripped and open condition.
Figure 2D:
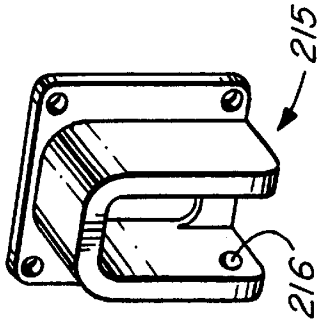
FIG. 2D, appearing with FIG. 2C, is an isometric view of the protective shroud connected to the latching dump valve of FIGS. 2A, 2B and 2C, the shroud being used for restraining and protecting the toggle lever of the dump valve.

The latching dump valve 105 has a protective shroud 215 mounted to the body 213 (FIGS. 2C and 2D). The protective shroud 215 acts to protect the spring biased toggle lever 201. A hole 216 allows a padlock (not illustrated) to be inserted and locked in position. The use of the padlock prevents the toggle lever 201 from being relatched.

A first inlet port 263 (FIGS. 1, 2A and 2B) is provided in dump valve 105 for entry of the fluid from the SSV safety valve circuit 132 which is used to maintain the surface safety valve 103 in its open position. Reservoir port 264 allows fluid egress from the cavity 270 to reservoir 122 when the dump valve poppet 250 is in the open position.

A second inlet port 271 is provided to allow for fluid ingress from the SSV trip control circuit 131 to cavity 230.

Figure 3A:
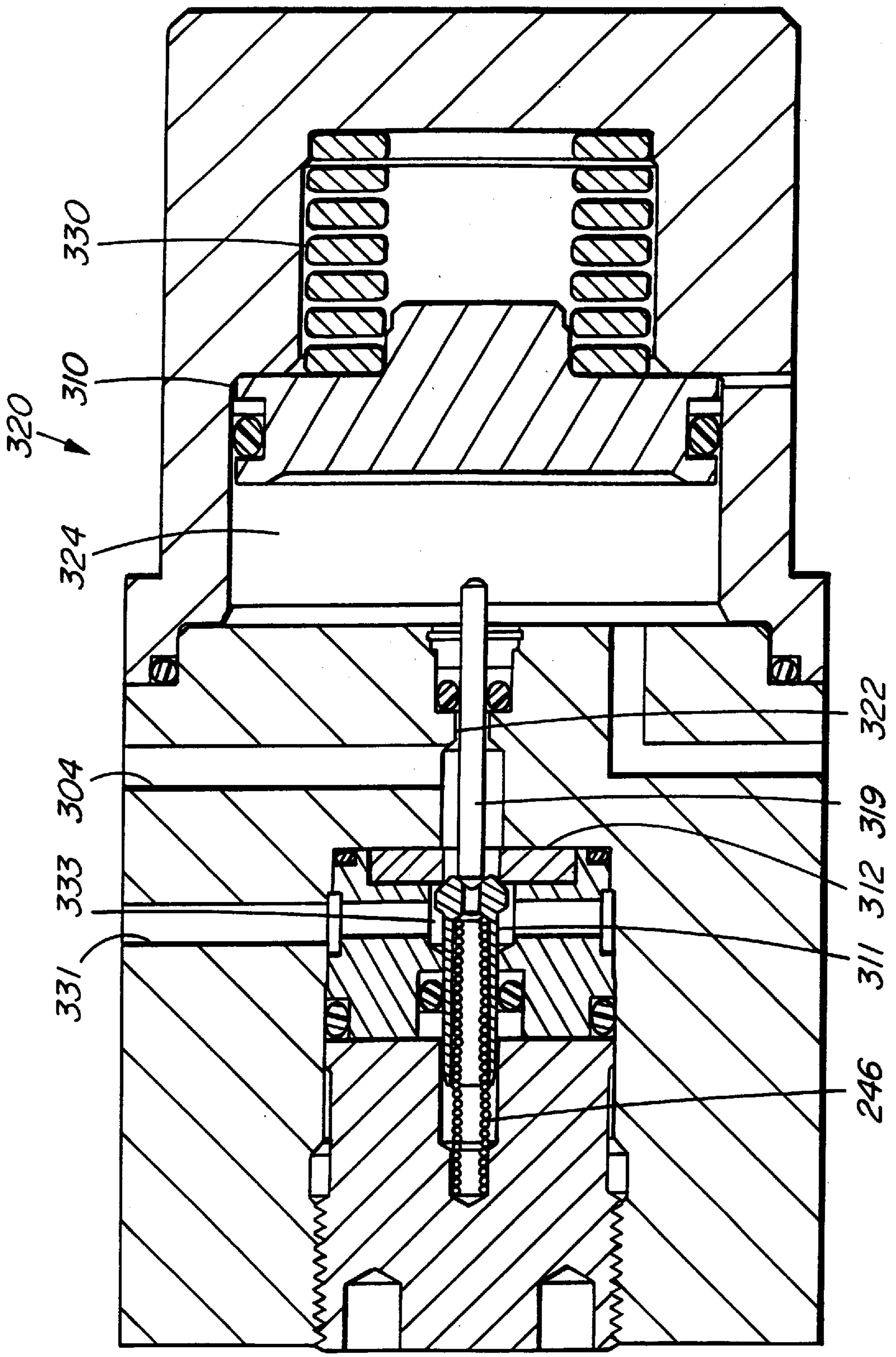
FIG. 3A is a diagrammatic cross-sectional view of the dump valve according to a further embodiment of the invention, the dump valve being of the non-latching type and used to close the downhole subsurface safety valve.

Additional embodiments of the non-latching dump valves are illustrated in FIGS. 3A–3E. FIG. 3A illustrates a dump valve generally illustrated at 320. In this embodiment, the dump valve poppet 311 is in contact with the dump valve poppet seat 312. Pin or pushrod 321 reciprocates within bore

322 and is adapted to contact dump valve poppet 311. Dump valve poppet 311 opens when pin 321 is contacted by piston 323 as fluid leaves cavity 324 and piston 323 moves toward pin 321 under the influence of compression spring 330. In this embodiment, there is no toggle lever 201 and no time delay feature is built into the dump valve 320. Inlet port 331 allows fluid to enter the dump valve 320 and pass to cavity 333. Fluid is dumped when the pin 321 is contacted by piston 323 which opens the dump valve poppet 311 and allows fluid to exit from cavity 333 through exit port 332.

Figure 3B:
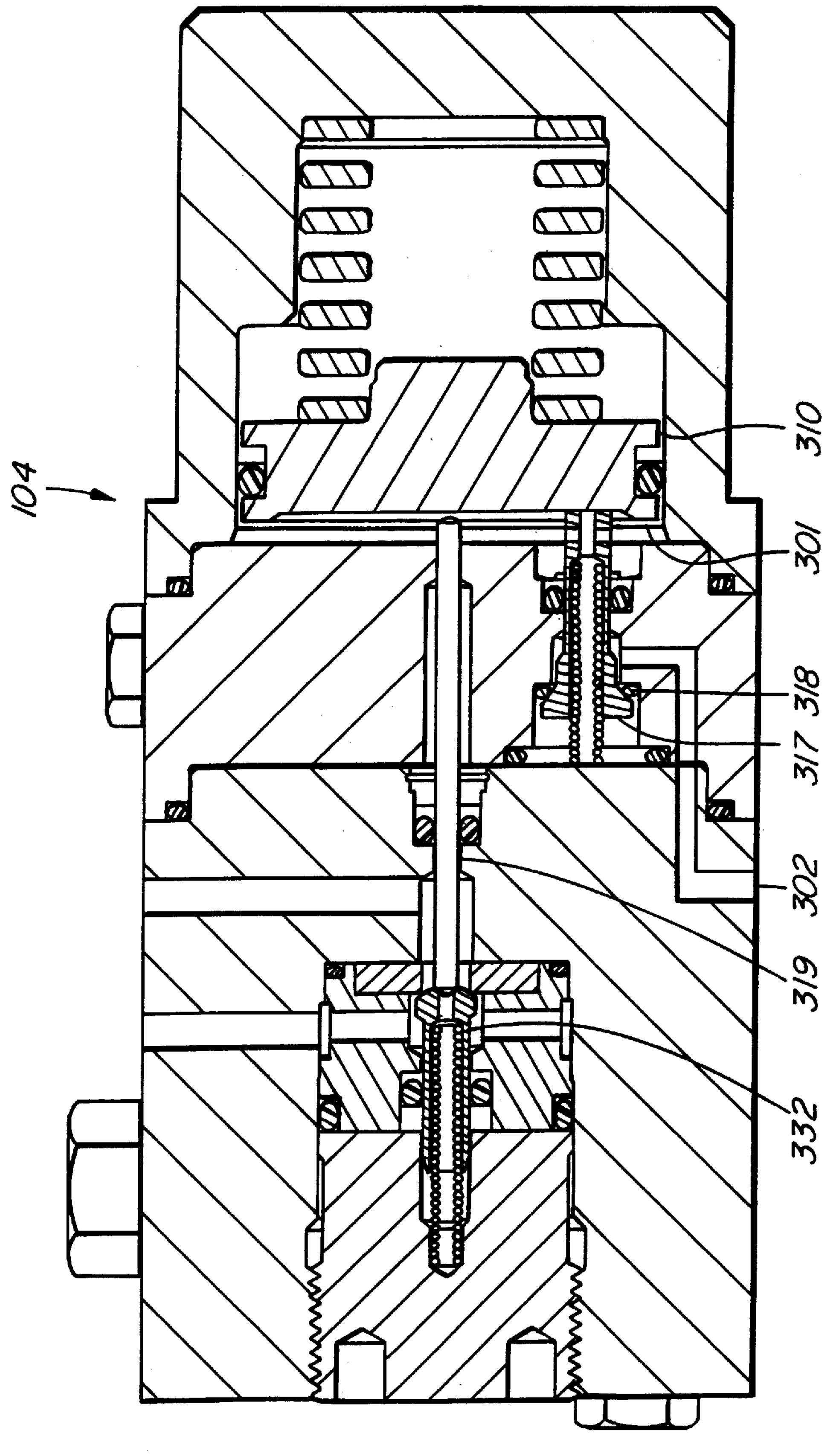
FIG. 3B is a diagrammatic cross-sectional view of a dump valve according to a further embodiment of the invention, the dump valve being of the non-latching type, and particularly illustrating the dump valve just prior to the opening of a bypass poppet, the dump valve poppet being shown in its closed position.
Figure 3C:
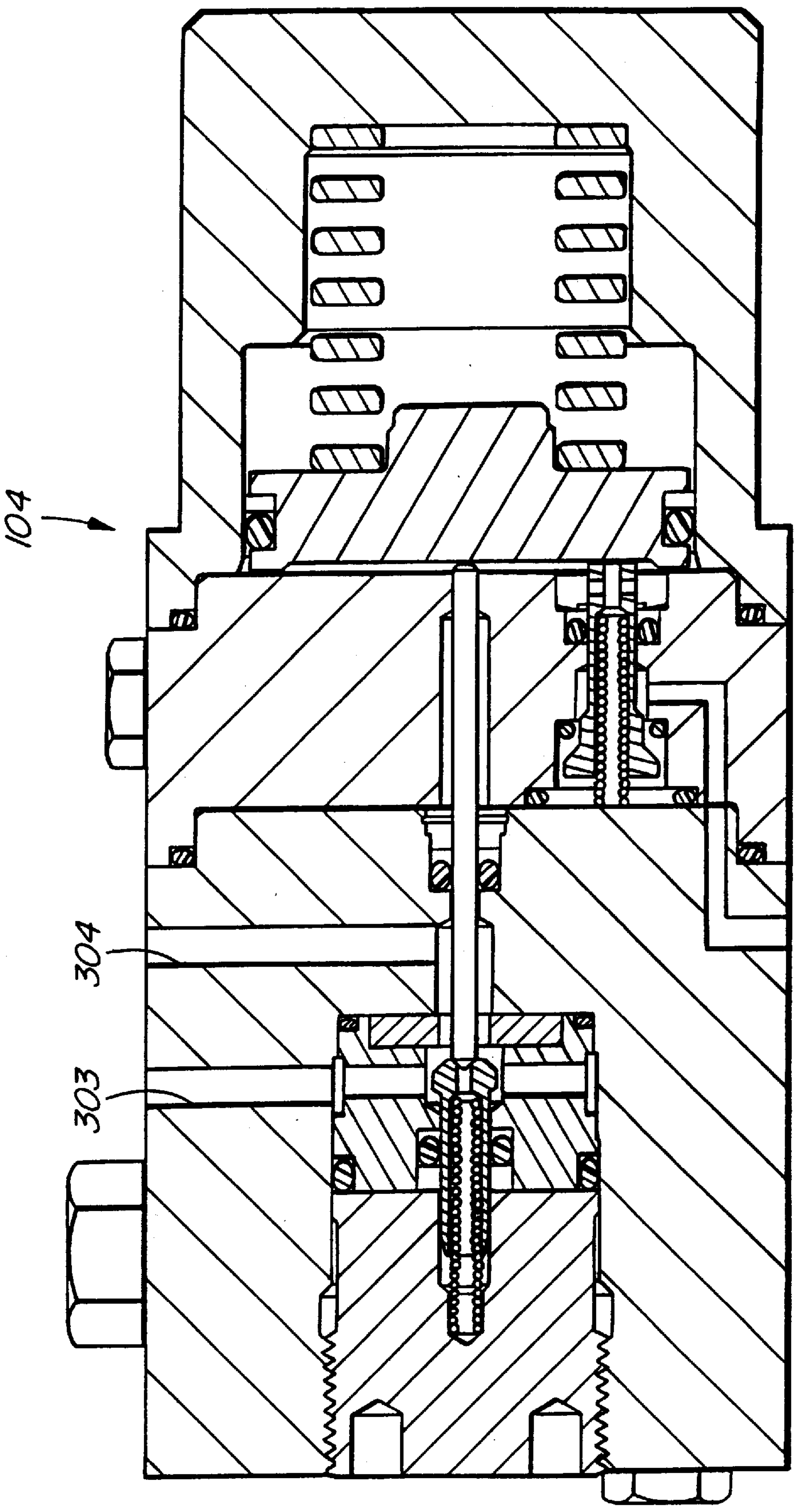
FIG. 3C is a diagrammatic cross sectional view of the dump valve of FIG. 3B illustrating the bypass poppet and the dump valve poppets in their open condition.

Reference is made to dump valve 104 as seen in FIG. 3C. Dump valve 104 has inlet port 303 and exhaust port 304 shown and such ports correspond to those ports correspondingly numbered in FIG. 1. It will be particularly noted that when dump valve poppet 305 is opened and the SCSSV 102 is closed, fluid from the SCSSV safety valve circuit 130 exhausts from port 304 to an SCSSV return tank 306. This is useful since the fluid from the SCSSV safety valve circuit 130 may be contaminated with well fluid and, if so, can be discarded rather than commingling with the fluids of the other circuits which contain only uncontaminated and clean hydraulic fluid. If the other circuits are contaminated with well fluid from the SCSSV safety valve circuit 130, damage to various of the circuit components may result.

Figure 3D:
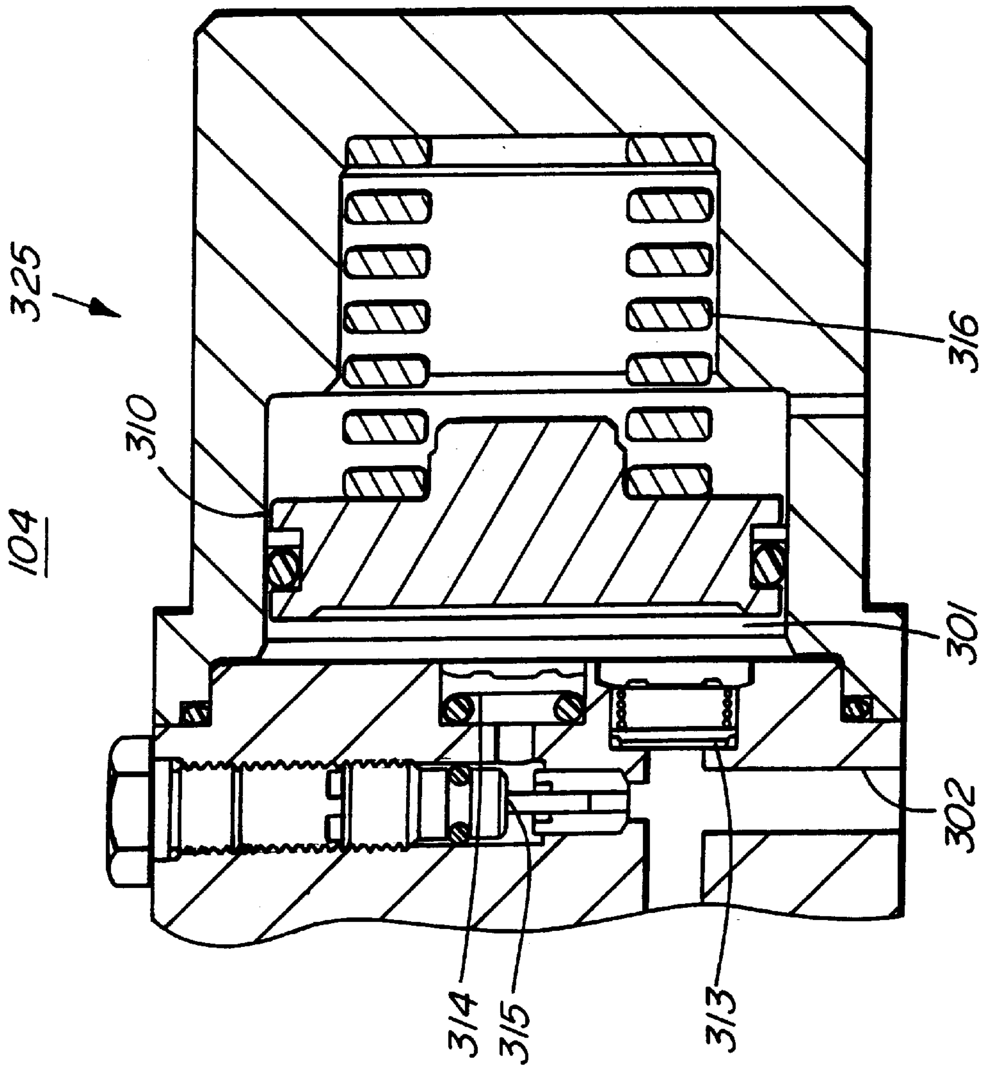
FIG. 3D is a diagrammatic partial cross-sectional view of the non-latching dump valve according to FIGS. 3B and 3C particularly illustrating the adjustable orifice used for time delay purposes in closing the downhole subsurface safety valve.

FIG. 3D illustrates a dump valve 325 with an adjustable orifice 315. The adjustable orifice 315 facilitates reducing the rate at which fluid exits from cavity 301 thereby providing adjustment of the time required for fluid to leave cavity 301. This is useful when it is desired to close the SCSSV 102 sometime later than the closure of the SSV 103.

Figure 3E:
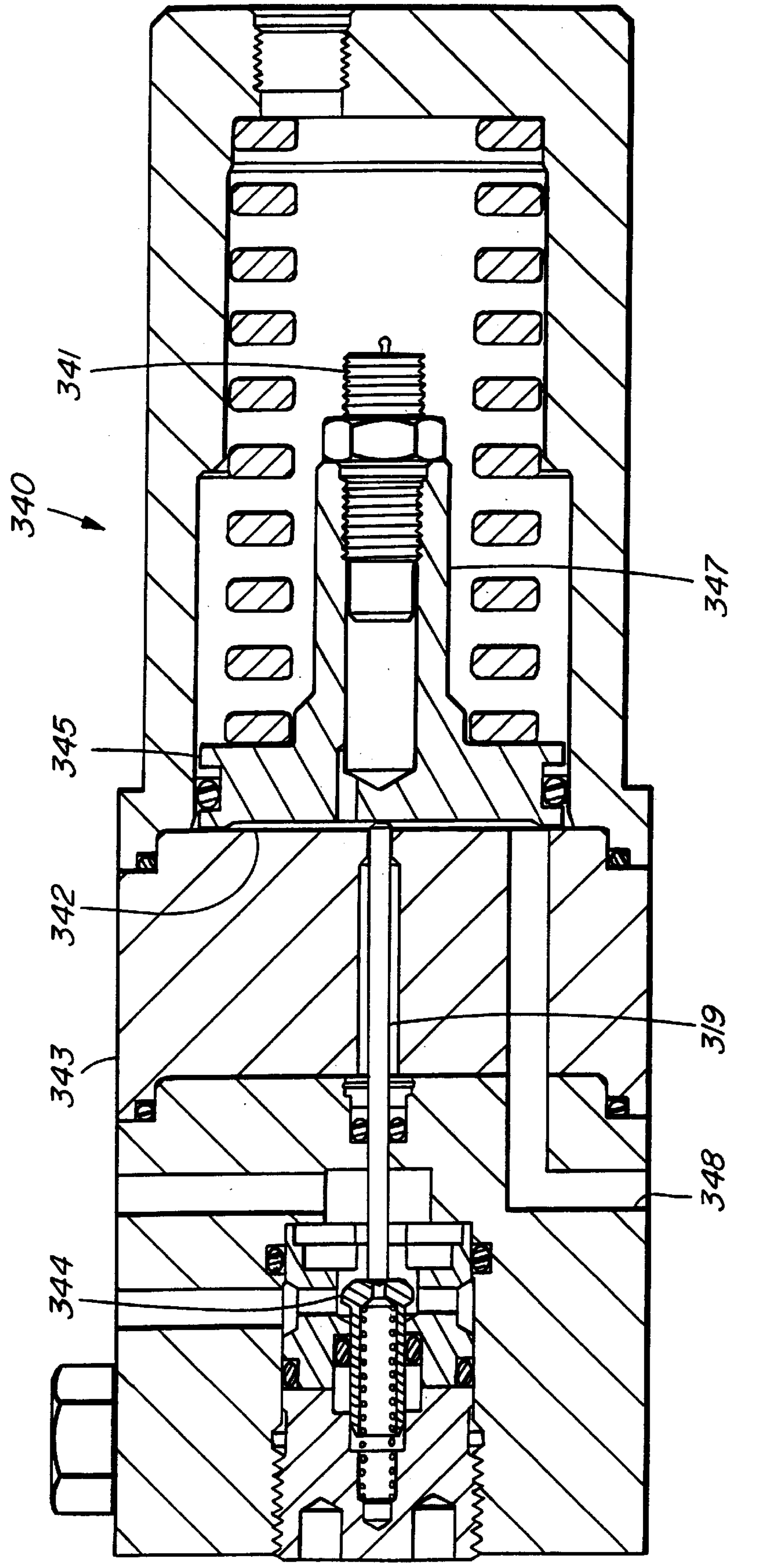
FIG. 3E is a diagrammatic cross-sectional view of a further embodiment of the non-latching dump valve wherein a pressure relief valve is incorporated in the piston to relieve excess pressure in the control circuit acting on the dump valve.

FIG. 3E illustrates a dump valve generally illustrated at 340 likewise of the non-latching type. Dump valve 340 includes a pressure relief valve 341 mounted within piston extension 347. Pressure relief valve 341 allows pressure to be relieved from cavity 342 when the fluid entering port 348 from the associated trip control circuit and maintaining piston 345 in its rightwardly location prior to fluid dump of the safety valve circuit, expands due to high temperatures. The dump valve 340 is similar to the dump valve 320 of FIG. 3A but an additional body portion 343 has been added to allow the use of a bypass poppet (not illustrated) and an adjustable orifice (not illustrated) used to create a time delay before opening the dump valve 344 by the action of the piston 345 on pushrod 346. The bypass poppet and the adjustable orifice would be of the same type as those illustrated in the embodiments of FIGS. 3B, 3C and 3D.

OPERATION

In operation and with initial reference to FIG. 1, it will first be assumed that the subsurface safety valve 102 and the surface safety valve 103 are in their closed conditions such that there is no flow through the flowline. It is desired to first close the subsurface safety dump valve 104 in order to first open the subsurface safety valve 102.

The dual action pump 110 is manually operated by an operator using the handle 114. The fluid pumped from the high pressure piston 120 will pass through check valve (CV5) 117 to pressure regulating valve 112, back pressure check valve 124 being closed until a predetermined pressure is reached. The fluid from pressure regulating valve 112 will pass through check valve(CV1) 118 into SCSSV trip control circuit 123 and thence to port 302 (see also FIG. 3D) through check valve 313 and into cavity 301. As pumping continues, the fluid will move piston 310 rightwardly as viewed in FIG. 3D thereby compressing spring 316. The pressure increases in the SCSSV trip control circuit 123 of the subsurface safety valve 102 until the piston 310 of dump valve 104 reaches the position illustrated in FIG. 3A, the piston 310 being out of contact with pushrod 321 thereby allowing the dump valve poppet 311 (FIG. 3A) to contact poppet seat 312 due to the bias provided by spring 246 (FIG. 2A). As the pressure buildup in SCSSV trip control circuit 123 continues, the pressure regulating or reducing valve 112 (FIG. 1) closes, conveniently at approximately 100 psi. Check valves 118, 119 will maintain the desired control pressure in the emergency shut down and fusible field trip control circuit 123 to keep the dump valve 104 in its closed position.

As the pumping of dual action pump 110 continues and fluid continues to exit from the high pressure piston 120, the pressure within the circuit upstream of the back pressure valve 124 will continue to increase until the back pressure valve 124 opens at a predetermined pressure, conveniently 150 psi. Fluid will then travel through back pressure valve 124 directly via the SCSSV down hole safety valve circuit 130 to the subsurface safety valve 102 until it is sufficient to open the subsurface safety valve 102. This pressure value may be seen on gauge 126. Pumping is continued until sufficient fluid has entered accumulator 134 and is then terminated. The pressure in downhole safety valve circuit 130 will remain at this value due to the closure of the dump valve poppet 311 which prevents fluid flow in the SCSSV safety valve circuit 130 to reservoir 122 via port 304 (FIG. 3C) and the check valve action of back pressure valve 124.

Three-way control valve 106 is then manually operated to bypass the fluid pumped by the high pressure piston 120 back directly to reservoir 122. The latching dump valve 105 is then manually closed by rotating toggle handle 201 (FIG. 2A) to prevent fluid entering port 263 and passing directly to reservoir 122 via port 264, in the event the dump valve poppet 250 was open. With the closure of the dump valve poppet 250, continued pumping results in pressure buildup in the SSV actuator control circuit 132 until the surface safety valve 103 is open. An actuator rod (not illustrated) associated with the surface safety valve 103 indicates the open condition of the surface safety valve 103.

When the surface safety valve 103 is open, there will be flow in the flowline (not illustrated) and it will be assumed that the flow line is in desired operating pressure range and both the high trip and low trip pilot valves 170, 180, respectively, are in their closed positions. If one of either the high or low trip pilot valves 170, 180 are not within the correct operating pressure range, it will remain in its open condition and fluid from the pilot controlled surface safety valve trip control circuit 131 will return to reservoir 122 thereby allowing the surface safety valve 103 to gradually close.

Pumping continues with fluid passing from the low pressure piston 133 of pump 110 through filter 115 and adjustable metering valve 116 to port 271 (see also FIG. 2A). When the high and low pressure pilots 170, 180 are closed, the pressure at port 271 will rise and piston 222 will move rightwardly with the buildup of fluid in cavity 230. The springs 220, 221 of the latching dump valve 105 will be compressed to balance the applied fluid pressure on the latching dump valve 105 through port 271 until, eventually, the toggle 201 will shift from the latched to the armed position under the influence of toggle spring 226. This movement of the toggle 201 will indicate to the operator that the flowline is within the desired operating pressure range. The surface safety valve of circuit 132 is then pumped to the full open position and to the correct operating pressure indicated on gauge 140 so as to replace the fluid lost to the pilot control circuit 113 while the pilot valves 170, 180 were open.

If there is an anomaly in the flow line such that the pressure monitored by either one of the high pressure or low pressure pilots 170, 180, respectively, falls below or rises above desired pressure operating conditions, that pilot will open thereby allowing fluid within the SSV trip control circuit 131 to return to reservoir 122. This will allow piston 222 (FIG. 2B) to move leftwardly and into contact with pushrod 252. Pushrod 252 will open dump valve poppet 250 allowing the fluid in SSV safety valve circuit 132 to exit to reservoir 122. There will no longer be fluid of sufficient pressure maintaining the surface safety valve 103 in its open position and the surface safety valve 103 will immediately close. Check valves 118, 119, however, continue to maintain the fluid pressure at port 302 of dump valve 104 which will maintain dump valve 104 in its closed position and subsurface safety valve 102 in its open condition.

Alternatively, if there is a high temperature event such as a fire which melts the fusible fitting 127 or in the event the emergency shut down(ESD) valve 128 is opened such as might happen by manual intervention in the event it is desired to close the SCSSV 102, the fluid in the SCSSV trip control circuit 123 will immediately pass to reservoir 122 thereby draining the fluid from that circuit. Fluid will drain from port 271 (see also FIG. 2A) of latching dump valve 105 via check valve 119. This will immediately open the latching dump valve 105 thereby closing the surface safety valve 103 as previously described.

With reference to FIG. 3D, the fluid in cavity 301 would then ordinarily drain from port 302 with the decrease in pressure in SCSSV trip control circuit 123. However, check valve 313 prevents the fluid from directly exiting from port 302. Rather, the fluid passes through filter 314 and adjustable orifice 315 to port 302. This provides a throttling effect on the egress of fluid from cavity 301 and increases the time required for the fluid to leave cavity 301 through port 302. This time delay ensures that the subsurface safety valve 102 closes after the closure of the surface safety valve 103 and, further, after a reduction of the pressure wave of fluid which reciprocates within the tubing of the well caused by the initial closure of the surface safety valve 103.

Reference is further made to FIG. 3B where a bypass poppet 317 is provided to allow fluid to quickly exit the cavity 301 through port 302 when the bypass poppet 317 is contacted by piston 310 and lifted off seal 318. The bypass poppet 317 allows the remaining pressure in cavity 301 to be reduced to zero allowing piston 310 to move downwardly into contact with pin 319. Thereafter, pin 319 is moved leftwardly by piston 310 and opens dump valve poppet 332 allowing fluid maintaining the subsurface safety valve 102 in its open position to escape and close the subsurface safety valve 102.

The operating action of the latching dump valve 105 is of interest and will be described in some detail. The latching dump valve 105 is closed by manually rotating the toggle lever 201 (FIG. 2A) about connecting pin 202 to the position indicated thereby pulling the spool 203 rightwardly with connecting pin 202. Cap screw 210, being connected to spool 203, will be moved rightwardly with spool 203 and out of contact with poppet 234. Piston 222 will also be moved rightwardly and the seal 231 in piston 222 will no longer be within the area of the cutouts 224. The seal 231 will, therefore, form a sealing relationship within the first diameter 223 of the body 213 of the dump valve 105. As the pressure increases in the cavity 235, due to the rightward movement of piston 222, poppet 234 will open to equalize the pressure between cavities 235 and 230. Once the pressure is equalized, poppet 234, being under the influence of compression spring 240, will close and abut seal 233 creating a barrier against further fluid flow into cavity 235. Dump valve poppet 250, being biased into contact with poppet seat 253 by compression spring 246 and being out of contact with pin or pushrod 252, will likewise form a sealing relationship with dump valve poppet seat 253. This position of the toggle lever 201 and the condition of the latching dump valve 105 is known as the LATCHED condition.

Three way valve 106 is positioned to provide a controlled relatively low pressure fluid from the low pressure piston 133 of pump 110 through pressure reducing valve 112, filter 115 and adjustable metering valve 116 to inlet port 271 of the latching dump valve 105. This forces piston 222 further rightwardly as viewed in FIG. 2B until it abuts spring stop 212 against the force of the inner compression spring 220 and the added force of the outer compression spring 221.

As the pumping continues, the piston 222 continues to move rightwardly until the toggle lever 201, being under the influence of a torsion spring 226 (FIG. 2C) is no longer restrained by end plug 214 and rotates to the position illustrated in FIGS. 2B and 2C. This position of the toggle 201 and the condition of the dump valve 105 as shown in FIG. 2B is known as the ARMED condition and the configuration of FIG. 2C is the OPEN condition.

If it is desired to close the SSV 103 for maintenance work or otherwise, without necessarily closing the SCSSV 102, the operator may exert a sidewise and leftwardly directed force on the spool 203. This will cause cap screw head 211 to lift poppet 234 out of contact with o-ring 233 thus allowing fluid within cavity 230 to move to cavity 235 and thence to reservoir 122 via port 264. Piston 222 will move leftwardly until contact with pushrod 252 is made and dump valve poppet 250 is opened. Fluid in the safety valve circuit 132 will exit through reservoir port 264 to reservoir 122 and the SSV 103 will immediately close. SCSSV 102, however, is maintained in its open position as previously described due to the action of check valves 118, 119, which isolate the SCSSV trip control circuit 123 from any pressure decrease in the SSV safety valve circuit 132.

It is contemplated that more than a single surface safety valve may be utilised in accordance with the invention. In this case, each additional surface safety valve would have an associated dump valve of the non-latching variety with its own safety valve circuit and each dump valve associated with each additional surface safety valve would utilise a time delay feature to ensure closure of its associated surface safety valve at a predetermined time following closure of the first surface safety valve 103 due to the opening action of the latching dump valve 105 associated with surface safety valve 103.

Many further embodiments will readily occur to those skilled in the art to which the invention relates and while specific embodiments of the invention have been described and illustrated, such descriptions should be considered as illustrative of the invention only and not as limiting its scope as defined in accordance with the accompanying claims.

I claim:

1. Wellhead safety valve control system for opening and closing a surface safety valve (SSV) and a surface controlled subsurface safety valve (SCSSV), said system comprising a first dump valve and a first safety valve circuit operably associated with said surface safety valve, a second dump valve and a second safety valve circuit operably associated with said surface controlled subsurface safety valve, an SSV trip control circuit operably associated with said first dump valve, an SCSSV trip control circuit operably associated with said second dump valve, a pump for pumping hydraulic fluid, said pump being operably associated with said first and second safety valve circuits and at least one check valve to operably isolate said SCSSV trip control circuit of said second dump valve from said SSV trip control circuit of said first dump valve.

2. Wellhead safety valve control system as in claim 1 and further comprising a toggle operably associated with said first dump valve, said toggle being operable to close said first dump valve.

3. Wellhead safety valve control system as in claim 2 wherein said pump has first and second pistons, said first and second pistons having first and second diameters, respectively, said first diameter being larger than said second diameter, said first and second pistons supplying fluid to said first and second safety valve circuits at relatively lower and higher pressures, respectively.

4. Wellhead safety valve control system as in claim 3 and further comprising a valve to direct fluid from said pump to either of said first and second dump valves or to a reservoir.

5. Wellhead safety valve control system as in claim 4 and further comprising a time delay orifice operably associated with said second dump valve.

6. Wellhead safety valve control system as in claim 5 and further comprising a bypass valve operably associated with said second dump valve.

7. Wellhead safety control system as in claim 6 and further comprising a pilot to sense pressure in a flowline.

8. Wellhead safety control system as in claim 7 wherein said pilot comprises first and second trips, said first trip opening when said pressure in said flowline exceeds a predetermined value, said second trip opening when said pressure in said flowline falls below a predetermined value.

9. Wellhead safety control system as in claim 8 wherein said pilot is operably connected with said SSV trip control circuit of said first dump valve.

10. Wellhead safety control system as in claim 9 wherein said pilot exhausts fluid from said SSV trip control circuit to said reservoir when either of said first or second trips is open.

11. Wellhead safety control system as in claim 10 wherein said first dump valve opens when said SSV trip control circuit exhausts fluid to said reservoir.

* * * * *